(12) United States Patent
Lee

(10) Patent No.: US 8,631,681 B2
(45) Date of Patent: Jan. 21, 2014

(54) APPARATUS AND METHOD OF CALCULATING A WHEEL SPEED BY USING A TIRE FORCE SENSOR AND CHASSIS CONTROL SYSTEM USING THE SAME

(75) Inventor: Sung Yong Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 132 days.

(21) Appl. No.: 13/240,386

(22) Filed: Sep. 22, 2011

(65) Prior Publication Data

US 2012/0123612 A1 May 17, 2012

(30) Foreign Application Priority Data

Nov. 12, 2010 (KR) ........................ 10-2010-0112516

(51) Int. Cl.
*G01P 15/097* (2006.01)
(52) U.S. Cl.
USPC ........................... 73/1.37; 73/115.07; 73/1.14
(58) Field of Classification Search
None
See application file for complete search history.

(56) References Cited

U.S. PATENT DOCUMENTS

| | | | | |
|---|---|---|---|---|
| 5,004,980 A | * | 4/1991 | Ida et al. | 324/166 |
| 5,602,335 A | * | 2/1997 | Ouchi | 73/494 |
| 5,821,422 A | * | 10/1998 | Ouchi | 73/514.39 |
| 6,109,624 A | * | 8/2000 | Message et al. | 280/11.223 |
| 6,422,075 B1 | * | 7/2002 | Foster et al. | 73/494 |
| 6,605,938 B1 | * | 8/2003 | Sentoku et al. | 324/174 |
| 6,943,542 B2 | * | 9/2005 | Sentoku et al. | 324/174 |
| 7,249,528 B2 | * | 7/2007 | Inoue | 73/862.392 |
| 2001/0030466 A1 | * | 10/2001 | Ehrlich et al. | 303/191 |
| 2003/0093188 A1 | * | 5/2003 | Morita et al. | 701/1 |
| 2005/0140357 A1 | * | 6/2005 | Takizawa et al. | 324/174 |
| 2006/0110086 A1 | * | 5/2006 | Morita et al. | 384/448 |
| 2006/0265154 A1 | * | 11/2006 | Potts | 702/56 |
| 2006/0290200 A1 | * | 12/2006 | Davison et al. | 303/138 |
| 2007/0265756 A1 | * | 11/2007 | Joyce et al. | 701/51 |
| 2008/0037919 A1 | * | 2/2008 | Ozaki et al. | 384/448 |
| 2008/0285901 A1 | * | 11/2008 | Koike et al. | 384/448 |
| 2010/0124389 A1 | * | 5/2010 | Norimatsu et al. | 384/448 |
| 2012/0123612 A1 | * | 5/2012 | Lee | 701/1 |

FOREIGN PATENT DOCUMENTS

| | | |
|---|---|---|
| JP | 06305316 A | 11/1994 |
| JP | 07186915 A | 7/1995 |
| JP | 2001165949 A | 6/2001 |
| JP | 2009186303 A | 8/2009 |
| KR | 10-2005-0024451 | 3/2005 |
| KR | 10-2008-0009712 | 1/2008 |
| KR | 1020090034519 A1 | 4/2009 |
| KR | 1020090112280 A | 10/2009 |

\* cited by examiner

*Primary Examiner* — Thomas Tarcza
*Assistant Examiner* — Richard Goldman
(74) *Attorney, Agent, or Firm* — Edwards Wildman Palmer LLP; Peter F. Corless

(57) ABSTRACT

An apparatus for calculating a wheel speed is described herein which includes a tire force sensor, a time measurement unit, an angular velocity calculation unit and a wheel speed calculation unit. The tire force sensor outputs a signal in accordance with an amount of modification of a bearing. The time measurement unit measures a time interval between peak values of the signal output from the tire force sensor. The angular velocity calculation unit calculates an angular velocity by dividing an angle between balls positioned within the bearing by the time interval measured by the time measurement unit. The wheel speed calculation unit calculates the wheel speed by multiplying a distance from a center of the bearing to a center of the ball by the angular velocity calculated by the angular velocity calculation unit.

6 Claims, 7 Drawing Sheets

APPARATUS AND METHOD OF CALCULATING A WHEEL SPEED BY USING A TIRE FORCE SENSOR AND CHASSIS CONTROL SYSTEM USING THE SAME

CROSS-REFERENCES TO RELATED APPLICATIONS

Priority to Korean patent application number 10-2010-0112516, filed on Nov. 12, 2010, which is hereby incorporated by reference in its entirety herein, is claimed.

BACKGROUND OF THE INVENTION

1. Field of the Invention

The present invention relates to an apparatus and a method of calculating a wheel speed by using a tire force sensor and a chassis control system using the same, and more particularly, to an apparatus and a method of calculating a wheel speed of a vehicle and a chassis control system using the same, in which the wheel speed is calculated by using a characteristic that a signal outputted from a tire force sensor has a peak value in a predetermined cycle.

2. Description of the Related Art

A chassis control system that controls the stability of a vehicle typically includes an anti-lock brake system (ABS), a traction control system (TCS) and an electronic stability control (ESC).

The TCS is an electronically controlled driving apparatus that is used to maximize acceleration of the vehicle by appropriately controlling slip of one or more wheels when the vehicle starts traveling or accelerates, and is used to reduce an engine torque when the vehicle travels around a curve to prevent the vehicle from "rolling over". More specifically, TCS is typically (but not necessarily) a secondary function of the ABS. TCS is typically designed to prevent the loss of traction of the driven road wheels, and therefore maintains the control of the vehicle when excessive throttling is applied by the driver and the condition of the road surface (due to varying factors) is unable to cope with the torque applied.

The ESC is a computerized technology that improves safety of a vehicle's stability by detecting and minimizing skids. When ESC detects loss of steering control, it automatically applies the brakes to help "steer" the vehicle where the driver intends to go. Braking is automatically applied to wheels individually, such as the outer front wheel to counter oversteer or the inner rear wheel to counter understeer. Some ESC systems also reduce engine power until control is regained. ESC does not improve a vehicle's cornering performance; instead, it helps to minimize the loss of control.

Generally, the chassis control system controls the vehicle at appropriate times when a driver cannot maneuver the vehicle alone, thereby ensures the stable operation of the vehicle. To this end, the conventional chassis control system controls the safety of the vehicle based on the wheel speed sensor mounted on the left, right, front and rear wheels.

FIG. 1 illustrates a conventional wheel speed sensor. As shown in FIG. 1, the conventional wheel speed sensor includes a tone wheel unit 11, which rotates with the wheel, and a hall sensor 12, which detects rotation. The tone wheel unit 11 of the conventional wheel speed sensor is exposed to the outside elements (see FIG. 2), and therefore, the tone wheel unit 11 may easily be damaged by, for example, gravel, dirt, etc., and accordingly when the tone wheel unit 11 is exposed to the elements for a long time, the recognition rate of the wheel speed sensor can be lowered due to foreign material introduced thereto. Furthermore, the chassis control system which relies on the wheel speed sensor for its data, can only detect when the wheel speed sensor becomes defective. It cannot however tell when foreign elements have been introduced into the tone wheel unit 11.

Thus, in the conventional chassis control system, when a wheel speed is not obtainable or is incorrect due to a defect in the wheel speed sensor, it is difficult to properly control the operational safety of the vehicle and thus a more effective system is required.

SUMMARY OF THE INVENTION

The present invention provides an apparatus and a method of calculating a wheel speed of a vehicle by using a peak value in a predetermined cycle of a signal outputted from a tire force sensor. The present invention also provides a chassis control system in which, when the wheel speed obtained through a wheel speed sensor has an abnormal value, the wheel speed obtained through an apparatus for calculating the wheel speed is used to control the operation of the vehicle.

In accordance with an aspect of the present invention, provided is an apparatus for calculating a wheel speed using a tire force sensor of a wheel hub type. More specifically, this tire force sensor is configured to output a signal in accordance with an amount of modification of a bearing. The apparatus also includes a time measurement unit that is configured to measure a time interval between peak values of the signal output from the tire force sensor; an angular velocity calculation unit that is configured to calculate an angular velocity by dividing an angle between balls positioned within the bearing by the time interval measured by the time measurement unit; and a wheel speed calculation unit configured to calculate the wheel speed by multiplying a distance from a center of the bearing to a center of the ball by the angular velocity calculated by the angular velocity calculation unit.

In accordance with another aspect of the present invention, provided is a method of calculating a wheel speed using a tire force sensor. More specifically, this method includes outputting, by the tire force sensor of a wheel hub type, a signal in accordance with an amount of modification of a bearing; measuring a time interval between peak values of the signal output from the tire force sensor; calculating an angular velocity by dividing an angle between balls positioned within the bearing by the measured time interval; and calculating the wheel speed by multiplying a distance from a center of the bearing to a center of the ball by the calculated angular velocity.

In accordance with still another aspect of the present invention, provided is a chassis control system using a wheel speed calculation apparatus. More specifically this system includes a wheel speed sensor configured to measure a wheel speed of a vehicle. This wheel speed calculation apparatus is configured to calculate the wheel speed of the vehicle by using a tire force sensor of a wheel hub type; and a chassis control apparatus configured to activate the wheel speed calculation apparatus when a defect occurs in the wheel speed sensor to receive the wheel speed and configured to generate a control command for safety control based on the received wheel speed.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Note that it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
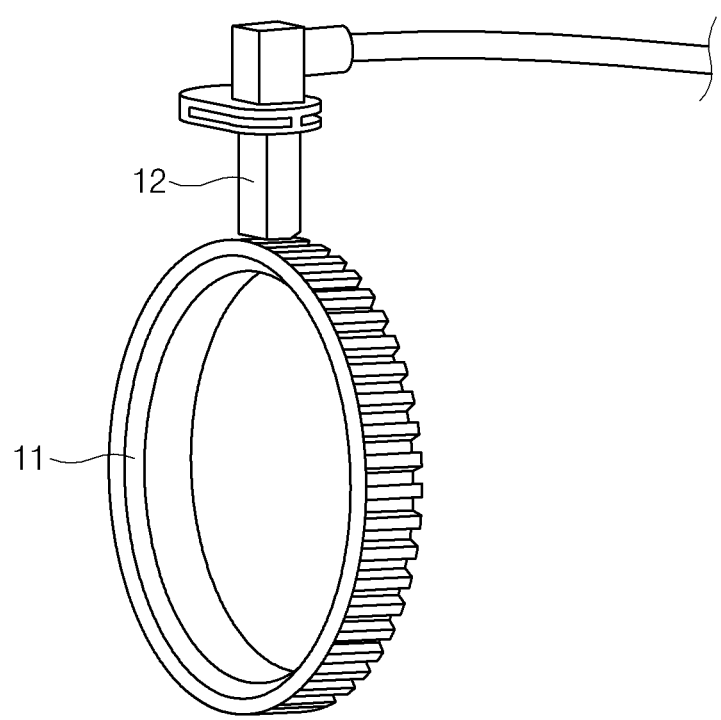
FIG. 1 illustrates a conventional wheel speed sensor.
Figure 2:
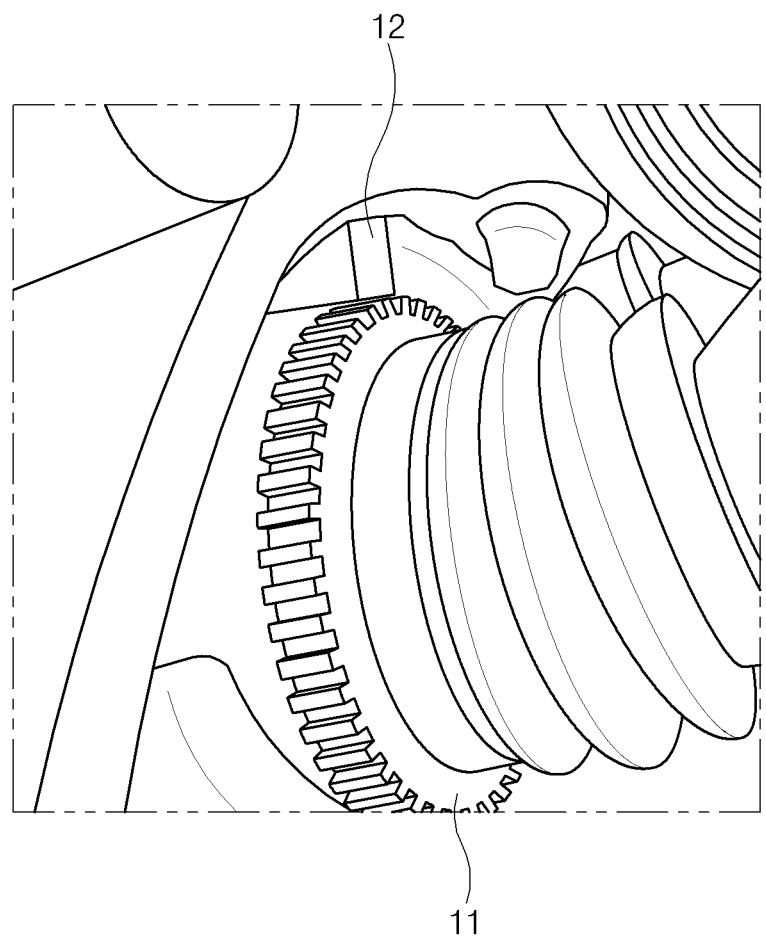
FIG. 2 illustrates an installation example of a conventional wheel speed sensor.
Figure 3:
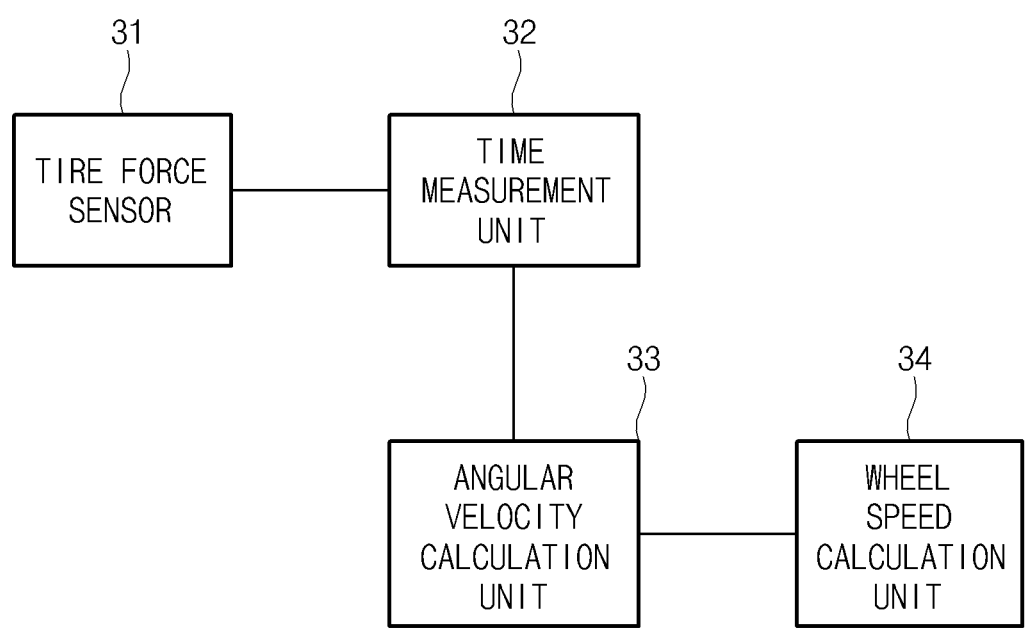
FIG. 3 illustrates a schematic view of a configuration of an apparatus for calculating a wheel speed using a tire force sensor according to an exemplary embodiment of the embodiment.

FIG. 3 illustrates a schematic view of a configuration of an apparatus for calculating a wheel speed using a tire force sensor according to an exemplary embodiment of the embodiment. As shown in FIG. 3, the apparatus for calculating a wheel speed using a tire force sensor includes a tire force sensor 31, a time measurement unit 32, an angular velocity calculation unit 33, and a wheel speed calculation unit 34.

Figure 4:
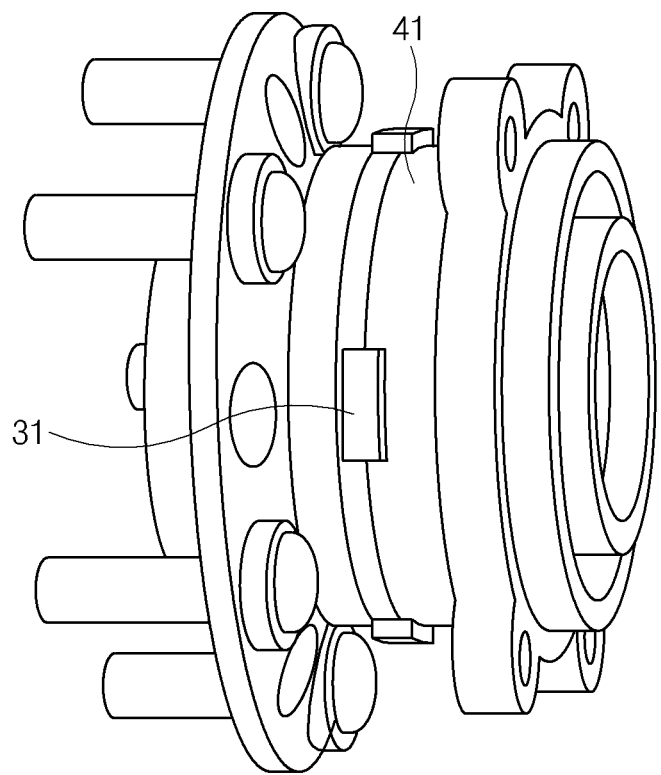
FIG. 4 illustrates a tire force sensor of a wheel hub type utilized in an exemplary embodiment of the embodiment.

Each of the above elements is described in more detail. The tire force sensor 31 is a wheel hub type sensor as shown in FIG. 4 and attached to a surface of a bearing 41 of four wheels (left, right, front and rear) of a vehicle.

Figure 5:
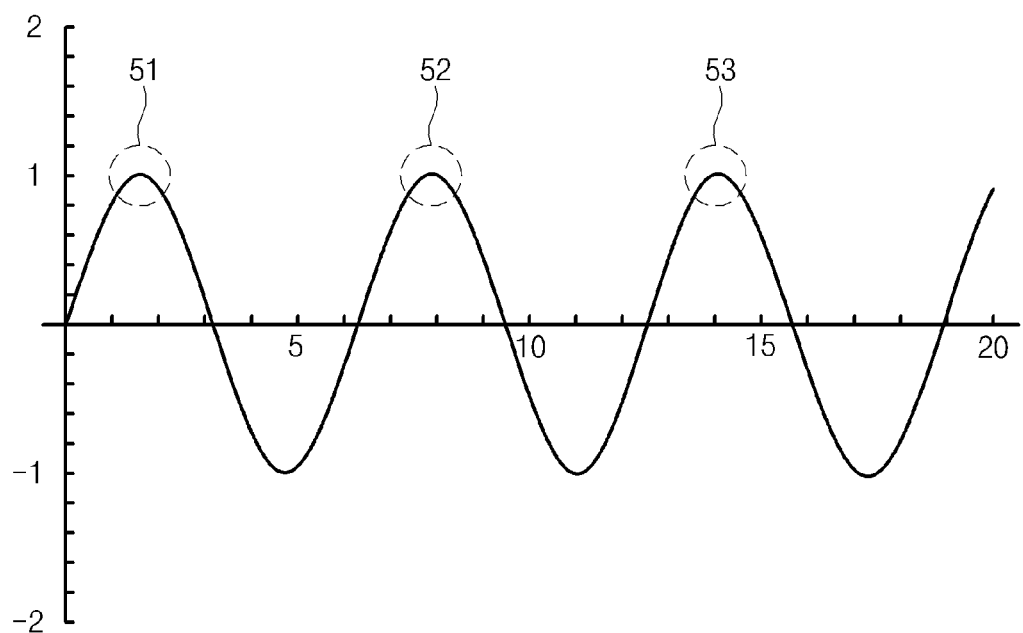
FIG. 5 illustrates an output signal of a tire force sensor of a wheel hub type utilized in an exemplary embodiment of the embodiment.

Also, the tire force sensor 31 detects a modification of the bearing 41 caused by a force applied to a tire and outputs a signal according to the amount of the modification in the bearing 41. Here, as shown in FIG. 5, the signal indicating the amount of the modification is a sine wave signal that has peak values 51, 52 and 53 in a predetermined cycle. The peak value is generated by a ball positioned within the bearing 41 at a predetermined interval.

The time measurement unit 32 measures a time interval between the peak values of the signal outputted from the tire force sensor 31. In other words, the time measurement unit 32 measures time elapsed from the first peak value 51 until the second peak value 52 is reached and time period elapsed from the second peak value 52 until the third peak value 53 is reached. It should be noted that the time measurement is to be repeated in the next cycles.

The angular velocity calculation unit 33 divides an angle $\delta$ between the balls positioned within the bearing 41 by the time interval measured by the time measurement unit 32 to calculate an angular velocity $\omega$. Namely, the angular velocity calculation unit 33 calculates the angular velocity $\omega$ using the following equation 1:

$\omega = \delta/$(the time interval between the peak values), wherein $\delta = 360°/$(number of the balls)    [Equation 1]

The wheel speed calculation unit 34 multiplies a distance r between the center of the bearing 41 and the center of the ball by the angular velocity $\omega$ calculated by the angular velocity calculation unit 33 to calculate the wheel speed v. In other words, the wheel speed calculation unit 34 calculates the wheel speed v using the following equation 2:

$$v = r \times \omega$$    [Equation 2]

The wheel speed calculation unit 34 calculates the wheel speed with respect to the four wheels of the vehicle, and a process of calculating the wheel speed is performed in a continuous manner similar to a speedometer of the vehicle by for example, a processor or a controller.

Figure 6:
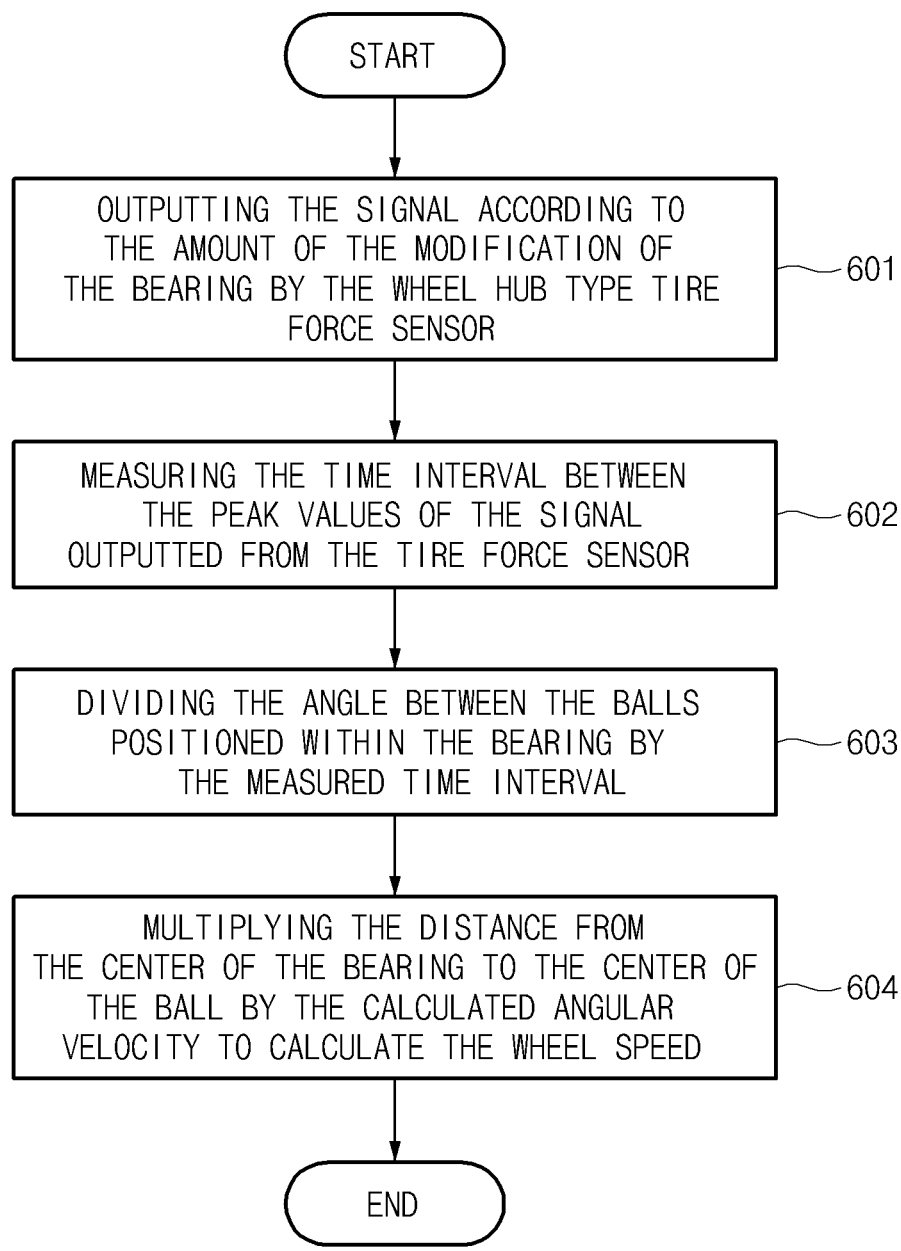
FIG. 6 is a flowchart illustrating a method of calculating a wheel speed using a tire force sensor according to an exemplary embodiment of the embodiment.

FIG. 6 is a flowchart illustrating a method of calculating a wheel speed using a tire force sensor according to an exemplary embodiment of the embodiment. First, the wheel hub type tire force sensor 31 attached to the surface of the bearing of the vehicle outputs the signal according to the amount of the modification of the bearing (step 601). Next, the time measurement unit 32 measures the time interval between the peak values of the signal outputted from the tire force sensor 31 (step 602). Then, the angular velocity calculation unit 33 divides the angle between the balls positioned within the bearing by the time interval measured by the time measurement unit 32 to calculate the angular speed (step 603). Subsequently, the wheel speed calculation unit 34 multiplies the distance between the center of the bearing and the center of the ball by the angular velocity calculated by the angular velocity calculation unit 33 to calculate the wheel speed (step 604).

Figure 7:
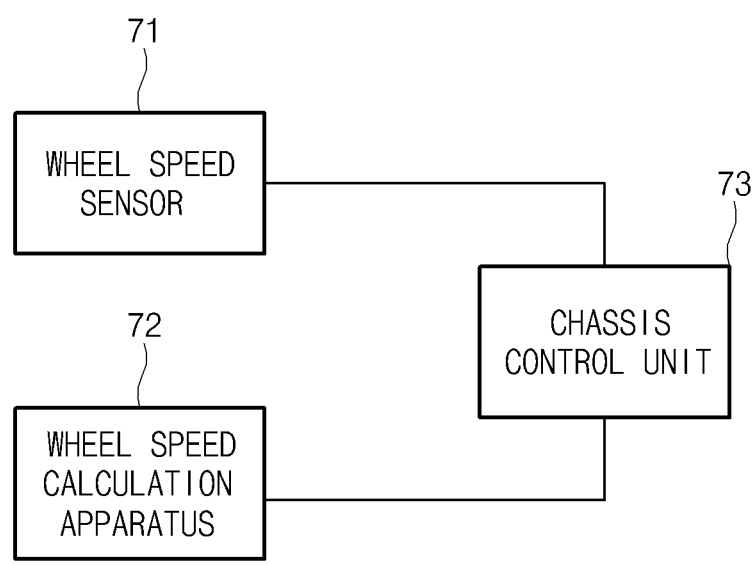
FIG. 7 illustrates a schematic view of a configuration of a chassis control system using an apparatus for calculating a wheel speed according to an exemplary embodiment of the embodiment.

FIG. 7 illustrates a schematic view of a configuration of a chassis control system using an apparatus for calculating a wheel speed according to an exemplary embodiment of the embodiment. As shown in FIG. 7, the chassis control system using the apparatus for calculating the wheel speed according to the present invention includes a wheel speed sensor 71, a wheel speed calculation apparatus 72, and a chassis control unit 73. Each of the above elements is described in more detail. The wheel speed sensor 71 is attached to the four wheels of the vehicle to measure the wheel speed of the corresponding wheel.

The wheel speed calculation apparatus 72 calculates the wheel speed in a similar manner as described above. When the wheel speed is not provided from the wheel speed sensor 71 through a controller area network (CAN) during a predetermined period of time or when the wheel speed data provided is erroneous, the chassis control unit 73 activates the wheel speed calculation apparatus 72 to receive the wheel speed from the wheel speed calculation apparatus 72.

Namely, when the wheel speed sensor 71 has a defect, the chassis control unit 73 replaces the wheel speed sensor 71 with the wheel speed calculation apparatus 72 to receive the wheel speed and generates a control command for safety control of the vehicle based on the received wheel speed.

In the present invention, a detailed operation of the chassis control unit 73, which is not the subject of the present invention, may use a technique that is well known in the art, as needed. In addition, the wheel speed of the vehicle can be calculated by using a peak value at a predetermined cycle from a signal outputted from the tire force sensor.

Also, according to the present invention, the wheel speed can be calculated by using a peak value at a predetermined cycle from a signal outputted from the tire force sensor such that the calculated wheel speed can be used as an alternative when the wheel speed sensor becomes defective.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus for calculating an angular velocity of a wheel, the apparatus comprising:
   a tire force sensor, the tire force sensor configured to detect a modification of a bearing surface caused by a force applied to a tire, and output a signal in accordance with an amount of modification of the bearing surface;
   a time measurement unit configured to measure a time interval between peak values of the signal output from the tire force sensor; and
   an angular velocity calculation unit configured to calculate the angular velocity of the wheel by dividing an angle between balls positioned within the bearing by the time interval measured by the time measurement unit.

2. The apparatus according to claim 1, wherein the signal has the peak value in a predetermined cycle due to the ball positioned within the bearing at a predetermined interval.

3. The apparatus according to claim 1, wherein the angular velocity calculation unit is configured to calculate the angular velocity by using an equation expressed as follows:

$$\omega = \delta/\alpha,$$

wherein $\alpha$ is the time interval between the peak values, and $\delta$ is an angle between the balls positioned within the bearing and is calculated as follows:

$$\delta = 360°/T,$$

wherein T is a number of the balls.

4. A method of calculating an angular velocity of a wheel using a tire force sensor, the method comprising:
   detecting, by the tire force sensor, a modification of a bearing surface caused by a force applied to a tire;
   outputting, by the tire force sensor, a signal in accordance with an amount of modification of the bearing surface;
   measuring a time interval between peak values of the signal output from the tire force sensor; and
   calculating an angular velocity of the wheel by dividing an angle between balls positioned within the bearing by the measured time interval.

5. The method according to claim 4, wherein the signal has the peak value in a predetermined cycle due to the ball positioned within the bearing at a predetermined interval.

6. The method according to claim 4, wherein the angular velocity is calculated by using an equation expressed as follows:

$$\omega = \delta/\alpha,$$

wherein $\alpha$ is the time interval between the peak values, and $\delta$ is an angle between the balls positioned within the bearing and is calculated as follows:

$$\delta = 360°/T,$$

wherein T is a number of the balls.

* * * * *